(12) United States Patent
Mizuno et al.

(10) Patent No.: US 6,437,969 B2
(45) Date of Patent: Aug. 20, 2002

(54) DIELECTRIC CERAMICS, MULTILAYER CERAMIC ELECTRIC PARTS AND METHOD FOR THE MANUFACTURE THEREOF

(75) Inventors: Youichi Mizuno; Yoshikazu Okino; Kenji Saito; Noriyuki Kohzu, all of Tokyo (JP)

(73) Assignee: Taiyo Yuden Co. Ltd., Tokyo (JP)

( * ) Notice: Subject to any disclaimer, the term of this patent is extended or adjusted under 35 U.S.C. 154(b) by 0 days.

(21) Appl. No.: 09/791,295

(22) Filed: Feb. 23, 2001

(30) Foreign Application Priority Data

Feb. 28, 2000 (JP) .......................................... 2000-051029

(51) Int. Cl.$^7$ ................................................ H01G 4/06
(52) U.S. Cl. .................... 361/311; 361/321; 361/321.4; 361/306.1; 361/321.5; 581/137; 581/139
(58) Field of Search .................................... 361/311, 312, 361/313, 314, 319, 320, 320.1, 321.4, 328, 329, 306.1, 321.2; 501/137, 139

(56) References Cited

U.S. PATENT DOCUMENTS 5,225,960 A * 7/1993 Kishi et al. ................. 361/321
5,268,342 A * 12/1993 Nishiyama et al. .......... 501/138
5,757,610 A * 5/1998 Wada et al. ................. 361/311
5,790,367 A * 8/1998 Mateika et al. ........... 361/321.4
5,977,006 A * 11/1999 Iguchi et al. ................ 501/137
6,087,287 A * 7/2000 Iguchi et al. ................ 501/137
6,225,250 B1 * 5/2001 Wada et al. ................. 501/137
6,303,529 B1 * 10/2001 Wada et al. ................. 501/137

FOREIGN PATENT DOCUMENTS

JP        411071172 A  *  3/1999

* cited by examiner

Primary Examiner—Dean A. Reichard
Assistant Examiner—Nguyen Ha
(74) Attorney, Agent, or Firm—Katten Muchin Zavis Rosenman

(57) ABSTRACT

Dielectric ceramic includes dielectric ceramic grains having $BaTiO_3$ as a major component thereof, a portion of the dielectric ceramic grains having a ferroelectric core and a paraelectric shell into which Mg and a rare earth element are diffused. The shell being located at least on a part of a surface of the core, wherein the shell includes at least two shell portions having different components diffused thereinto. The shell portions can be radially disposed on one another or be in direct contact with the surface of the core.

20 Claims, 4 Drawing Sheets

DIELECTRIC CERAMICS, MULTILAYER CERAMIC ELECTRIC PARTS AND METHOD FOR THE MANUFACTURE THEREOF

FIELD OF THE INVENTION

The present invention relates to dielectric ceramics for use in dielectric layers of multilayer ceramic capacitors; and more particularly, to a dielectric ceramics with core-shell grain structures capable of providing favorable B temperature characteristics, wherein various shell portions having different functions can be adaptably arranged around a core in a manner suitable for obtaining desired characteristics.

BACKGROUND OF THE INVENTION

When manufacturing multilayer ceramic capacitors having desired B temperature characteristics by using dielectric ceramics principally composed of barium titanate ($BaTiO_3$), it has been considered to be essential that crystal grains constituting the dielectric ceramics have a core-shell grain structure, wherein the core-shell grain structure includes a ferroelectric core and a paraelectric shell encompassing the core. The core-shell grain structure in the dielectric ceramics is obtained by using such additives as Mg and rare earth elements.

In manufacturing conventional dielectric ceramics having the core-shell grain structure, Mg and rare earth elements are added simultaneously to the dielectric ceramic material containing therein, e.g., $BaTiO_3$ as a main component and diffused together into grains to form shells thereof. Moreover, no measure has been taken to control the distribution of Mg and the rare earth elements in the grains, resulting in Mg diffusion substantially deep into the dielectric grains.

Therefore, the conventional dielectric ceramics including dielectric grains having core-shell grain structures to improve B temperature characteristics may not be adaptably controlled to have required properties. The thickness of the dielectric layers has been continuously reduced to obtain an ever-increasing capacitance of multilayer ceramic capacitors, necessitating various quality requirements in such scaled down dielectric layers. However, the conventional core-shell grain structure cannot effectively meet such various quality requirements for the multilayer ceramic capacitors.

SUMMARY OF THE INVENTION

It is, therefore, an object of the present invention to provide multilayer ceramic capacitors with an improved performance and reliability by adaptively tailoring the shell structure of ceramic grains according to the required characteristics.

In accordance with one aspect of the present invention, there is provided a dielectric ceramic comprising:

dielectric ceramic grains having $BaTiO_3$ as a major component thereof, a portion of the dielectric ceramic grains having a ferroelectric core and a paraelectric shell into which Mg and a rare earth element are diffused, the shell being located at least on a part of a surface of the core, wherein the shell includes at least two shell portions having different components diffused thereinto, respectively.

In accordance with another aspect of the present invention, there is provided a multilayer ceramic electric part comprising the dielectric ceramic.

In accordance with still another aspect of the present invention, there is provided a method for manufacturing the multilayer ceramic electric part comprising the steps of:

producing a ceramic powder mixture having ceramic particles, the producing step including the step of mixing MgO and a substance containing a rare earth element with a $BaTiO_3$ based dielectric ceramic material; and removing portions of surfaces of the ceramic particles

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
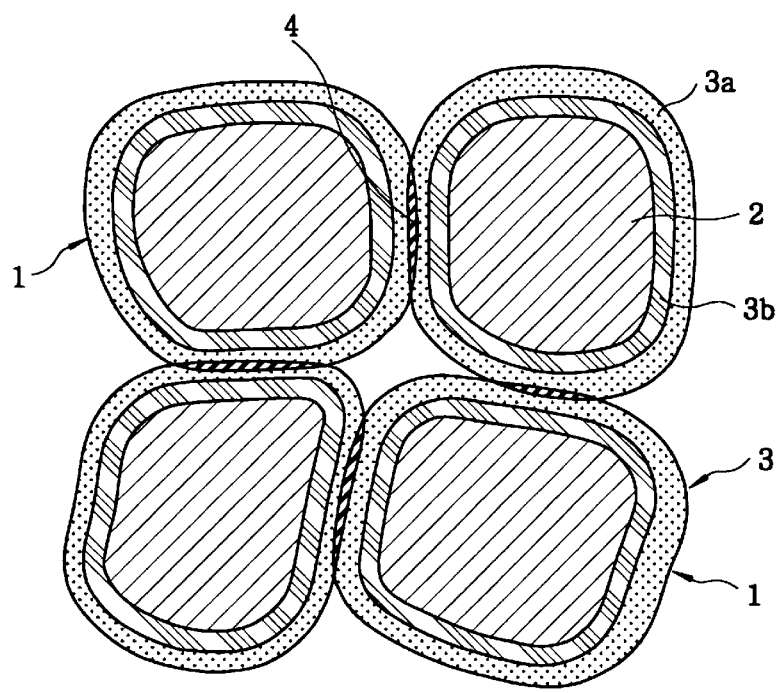
FIG. 1 schematically shows dielectric ceramic grains in accordance with a first preferred embodiment.

Referring to FIG. 1, there are schematically shown dielectric ceramic grains 1 constituting dielectric ceramic layers of multilayer ceramic capacitors, each dielectric ceramic grain generally having a core-shell grain structure in accordance with a first preferred embodiment of the present invention. The dielectric ceramic of the present invention is mainly composed of $BaTiO_3$ and each of the dielectric ceramic grains 1 generally includes a ferroelectric core 2, and a paraelectric shell 3 where Mg and one or more rare earth elements are diffused into $BaTiO_3$. The shell 3 encompassing the core 2 is basically formed of two shell portions, i.e., an outer shell portion 3a and an inner shell portion 3b into which different components are diffused. The outer shell portion 3a is formed of $BaTiO_3$ and Mg and one or more rare earth elements, e.g., Ho, both diffused into $BaTiO_3$. The inner shell portion 3b is formed of $BaTiO_3$ and Mg diffused thereinto.

The inner shell portion 3b formed by the diffusion of Mg into $BaTiO_3$ has a paraelectric phase with a high insulation resistance. Mg therein acts as an acceptor of the main component $BaTiO_3$. The presence of Mg in the inner shell portion 3b encompassing the core 2 provides $BaTiO_3$ with a reductive resistance and therefore the reduction of the ferroelectric core 2 formed of $BaTiO_3$ is prevented during a sintering process and operating life characteristics can be improved.

The outer shell portion 3a is formed of $BaTiO_3$ into which Mg and rare earth elements, e.g., Ho are diffused and has a paraelectric phase with a high insulation resistance. The rare earth element therein acts as a donor of the major component $BaTiO_3$. Therefore, the oxygen deficiency in the dielectric grains can be effectively compensated, thereby obtaining a high dielectric constant.

Further, the shell 3 may include a shell portion into which Zr is diffused in addition to Mg and/or one or more rare earth elements. Zr is effective in improving temperature characteristics and can be advantageously employed to obtain required temperature characteristics.

The shell structure with two separated portions 3a, 3b having distinct diffusion components can be obtained as follows: First, MgO powder is added to and mixed with the main component $BaTiO_3$ powder by a wet method and dispersed and heat-treated until the MgO powder is uniformly distributed in the powder mixture. The powder mixture is then made to obtain $BaTiO_3$ particles having peripheral portion into which Mg is diffused. Next, the powder of one or more rare earth elements, e.g., $Ho_2O_3$ powder, is added to and mixed with the heat-treated powder mixture thus obtained by a wet method until the rare earth powder is uniformly distributed in the mixture. The powder mixture is then heat-treated. Through the procedure described above, a heat-treated powder is obtained, wherein each particle in the heat-treated powder generally has a core-shell structure provided with a core portion located at the center portion of the particle and essentially composed of $BaTiO_3$, an inner shell portion located outside the core potion and composed of $BaTiO_3$ and Mg diffused thereinto, and an outer shell portion located outside the inner shell portion and composed of $BaTiO_3$ into which Mg and a rare earth element, e.g., Ho are diffused. Next, water and an organic binder are added to the heat-treated powder to make slurry. The slurry is used to produce ceramic green sheets and internal electrode patterns are then printed thereon. The pattern printed sheets are stacked against one another and the stack is diced into a multiplicity of chips. The chips are then sintered to thereby produce dielectric ceramics having the core-shell grain structure as shown in FIG. 1.

In the core-shell structured dielectric ceramics, there are also formed glassy grain boundary portions 4 at portions of shells 3 adjoining neighboring grains as shown in FIG. 1. The glassy grain boundary portions 4 have a large electrical resistance and include a glass component precipitated therein. The grain boundaries 4 can be formed by adding as a sintering additive a glass component, e.g., $SiO_2$, to raw materials of the dielectric ceramics and the thickness of the glassy grain boundaries 4 can be adjusted by varying the amount of the sintering additives. The grain boundaries 4 have a large electrical resistance, but are in the paraelectric phase having a lower dielectric constant than that of the core 2.

Figure 2:
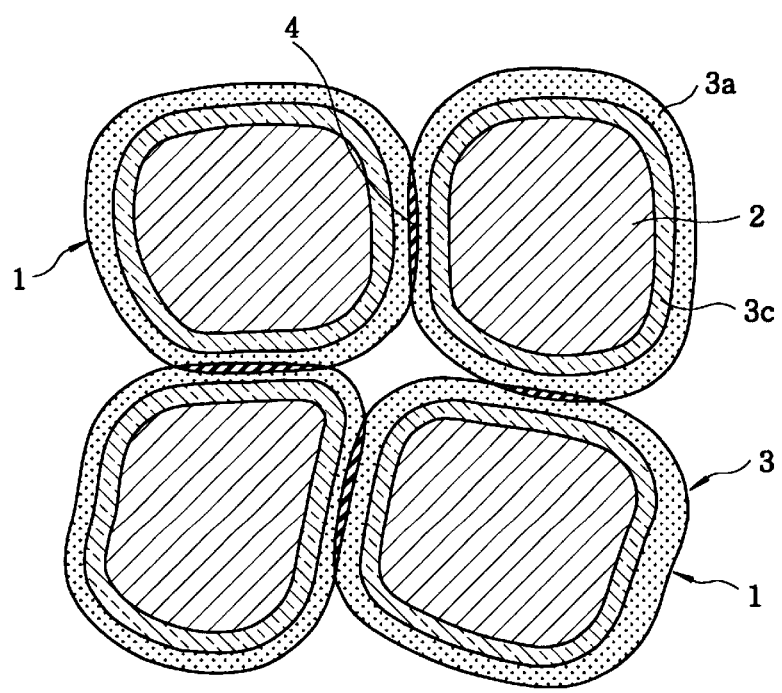
FIG. 2 schematically illustrates dielectric ceramic grains in accordance with a second preferred embodiment.

Referring to FIG. 2, there is schematically shown dielectric ceramic grains constituting a dielectric ceramic and each having a second core-shell grain structure in accordance with another preferred embodiment of the present invention. The first core-shell grain structure illustrated in FIG. 1 includes the shell 3 having the inner shell portion 3b formed by $BaTiO_3$ into which Mg is diffused and the outer shell portion 3a formed by $BaTiO_3$ into which rare earth elements, e.g., Ho, and Mg are diffused. On the other hand, the second core-shell structure of the present invention includes the shell 3 having an outer shell portion 3a into which Mg and Ho are diffused as in the first embodiment and an inner shell portion 3c where one or more rare earth elements, e.g., Ho, are diffused into $BaTiO_3$. The outer and the inner shell portions 3a, 3c respectively exhibit similar properties and therefore function similarly as those of the first preferred embodiment.

The second core-shell grain structure of the present invention is obtained by inverting the order of adding the MgO powder and the rare earth powder, e.g., $Ho_2O_3$ powder to the $BaTiO_3$ powder. To be more specific, the rare earth $Ho_2O_3$ powder is first added to and mixed with the main component $BaTiO_3$ powder and then the mixture is heat-treated, so that the heat-treated powder mixture having $BaTiO_3$ particles around which rare earth oxide such as $Ho_2O_3$ is diffused can be obtained. Next, the MgO powder is added to and mixed with the heat-treated powder mixture thus obtained and then the mixture is heat-treated. Consequently, the heat-treated powder obtained includes particles, wherein each particle generally has an outer shell portion including $BaTiO_3$ into which MgO and $Ho_2O_3$ are diffused and an inner shell portion located inside the outer shell portion and including $BaTiO_3$ into which $Ho_2O_3$ is diffused. Next, the heat-treated powder thus provided is mixed with water and an organic binder to make slurry. The slurry is used to produce ceramic green sheets and then internal electrode patterns are printed thereon. The pattern printed sheets are stacked against one another and the stack is diced into a plurality of chips. The chips are then sintered to thereby produce dielectric ceramics having the second core-shell grain structure shown in FIG. 2.

The inner shell portion 3c containing $BaTiO_3$ and rare earth element such as Ho serves to improve a dielectric loss tangent "tan δ" of a capacitor. The outer shell 3a formed of $BaTiO_3$ into which Mg and rare earth such as Ho are diffused functions to increase a dielectric constant.

Figure 3:
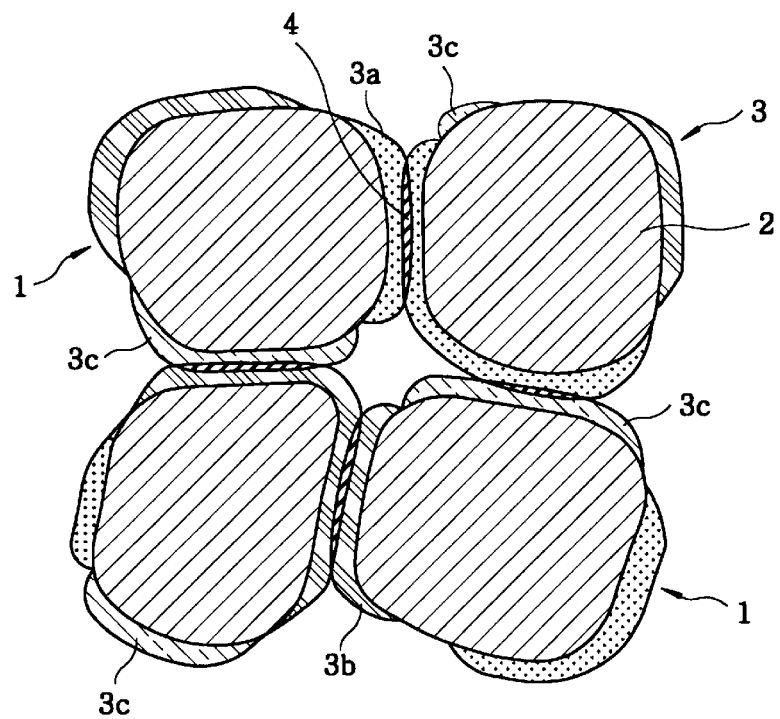
FIG. 3 schematically describes dielectric ceramic grains in accordance with a third preferred embodiment.
Figure 4:
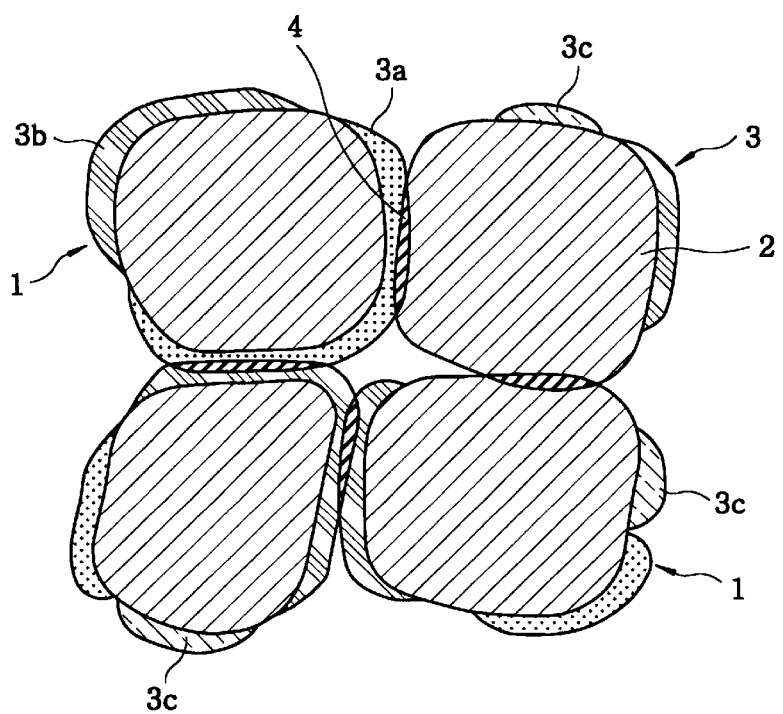
FIG. 4 schematically depicts dielectric ceramic grains in accordance with a third preferred embodiment.

Referring to FIGS. 3 and 4, there are shown schematic views of two exemplary core-shell grain structures in accordance with a third preferred embodiment of the invention. In this embodiment, the respective shell portions 3a, 3b, 3c are not radially separated but are unevenly distributed on the surface of the core 2, exposing some portions of the core 2. The effect of the improvements of the electrical characteristics due to the fact that shell portions have different diffusion components can be optimized by using the core-shell structures shown in FIGS. 3 and 4.

In the core-shell structures of the third preferred embodiment of the invention, grain boundaries of neighboring grains can be formed between shell portions of either a same type or different types as shown in FIG. 3 or between a core and a shell portion or between cores as shown in FIG. 4.

The exemplary core-shell grain structures shown in FIGS. 3 and 4 can be obtained by using a slurry formed in a similar manner described above with reference to the first and the second preferred embodiments excepting that the MgO powder and the rare earth powder, e.g., $Ho_2O_3$ powder are simultaneously added to the main material $BaTiO_3$ powder and heat-treated. In addition, the slurry is ball milled by using large beads so that some parts of the shells are removed, thereby partially exposing some parts of cores.

Figure 5:
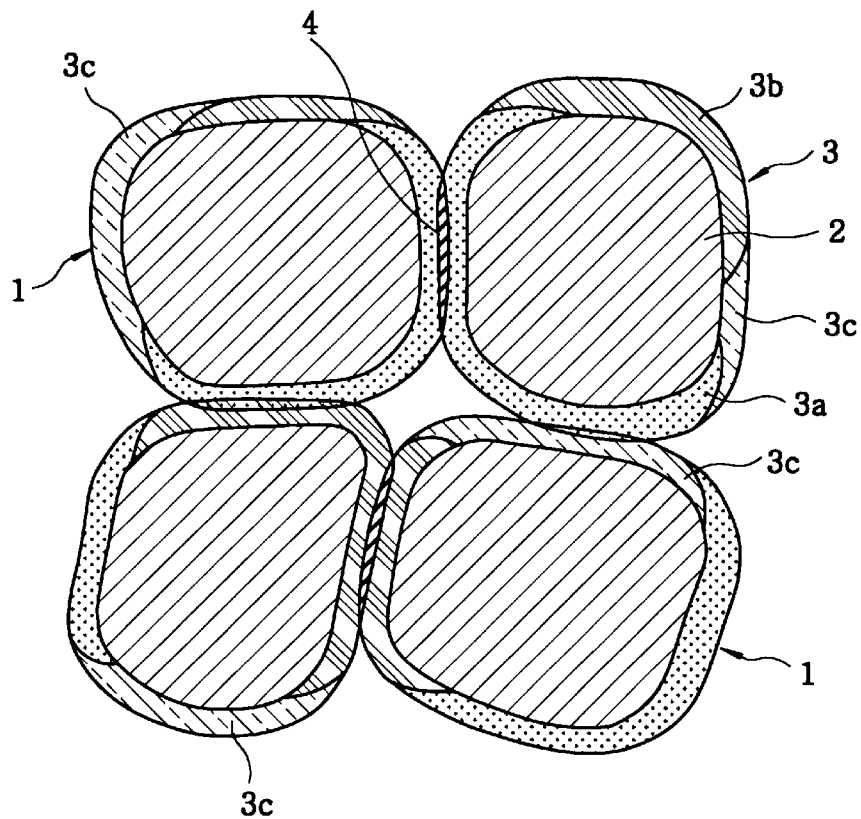
FIG. 5 schematically shows an exemplary core-shell grain structure in accordance with still another preferred embodiment.

Referring to FIG. 5, there is shown an exemplary core-shell grain structure in accordance with still another preferred embodiment, the shell portions 3a, 3b, 3c are not radially separated completely but are partially distributed on the surface of the core 2 with some parts of the shell portions overlapping with each other.

Next, a multilayer ceramic capacitor will be described as an example of multilayer ceramic electrical parts which can be made by using the dielectric ceramics, and a manufacturing method thereof will be explained thereafter.

First, as described above, one of the MgO powder and $Ho_2O_3$ powder is added to and mixed with the main material $BaTiO_3$ powder. The mixture is sintered and then the other powder is added to and mixed with the heat-treated mixture. The second mixture is also sintered as in the first and the second embodiments. Or, as in the third embodiment of the invention, the Mgo and the $Ho_2O_3$ powder can be mixed with the $BaTiO_3$ powder and sintered at the same time. Other additives can be used together with the MgO powder and/or the $Ho_2O_3$ powder. Then, the sintered mixture is dispersed uniformly in an organic binder such as ethyl cellulose dissolved in a solvent to produce slurry. The slurry is uniformly coated on a base film, e.g., terepthalate film, and dried to produce thin film green sheets. Then, the green sheets are cut to obtain ceramic green sheets of a proper size.

Next, a conductive paste is printed on the ceramic green sheets to produce two types of internal electrode patterns. The conductive paste contains a 100 wt % conductive powder of Ni, Cu, Ag, Pd, Ag-Pd and the like; a 3–12 wt % binder of ethyl cellulose, acryl, polyester and etc, and a 80–120 wt % solvent of butyl carbitol, butyl carbitol acetate, terpineol, ethyl cellosolve, hydrocarbon and etc uniformly mixed and dispersed.

The ceramic green sheets having internal electrodes patterns printed thereon are alternately stacked. Then, dummy sheets, on which the internal electrode patterns are not printed, are stacked on the lower side and the upper side of the stacked green sheets, and pressed together to produce a laminated body. The laminated bodies are cut into separate laminated elements. The internal electrodes are alternatingly exposed at opposite end surfaces of the laminated elements.

Thereafter, another conductive paste for use in forming external electrodes is applied on surfaces of both end portions of each laminated element. The laminated elements having the conductive paste thus applied are dried to produce multilayer ceramic elements. Then, the multilayer ceramic elements are sintered. During the sintering process, the ceramic layers are sintered and at the same time the internal electrode patterns and the conductive paste applied on the surfaces of the end portions are heat-treated. Thereafter, Sn or solder plating is performed on the conductive layers on the surfaces of the end portions thereby completing a manufacture of the multilayer ceramic capacitor. A partial cutaway view of an exemplary multilayer ceramic capacitor thus produced is illustrated in FIG. 6, wherein reference numeral 12 represents the external electrodes and 13 represents a sintered body of internal electrodes 15 and 16 and ceramic layers 17.

Figure 6:
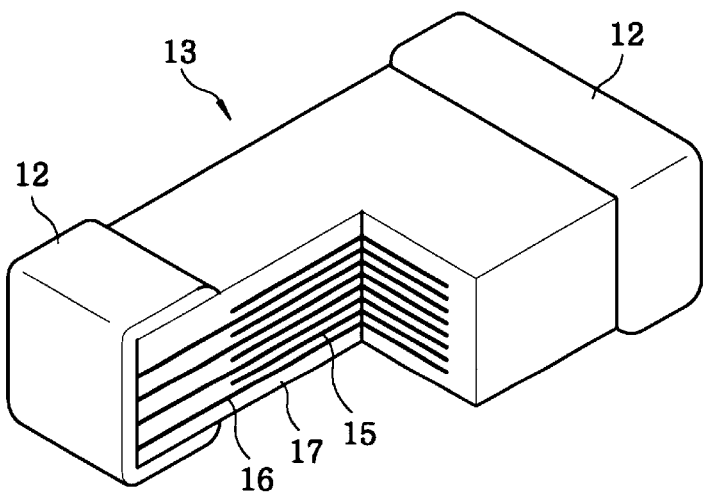
FIG. 6 is a partial cutaway view of an exemplary multilayer ceramic capacitor.
Figure 7:
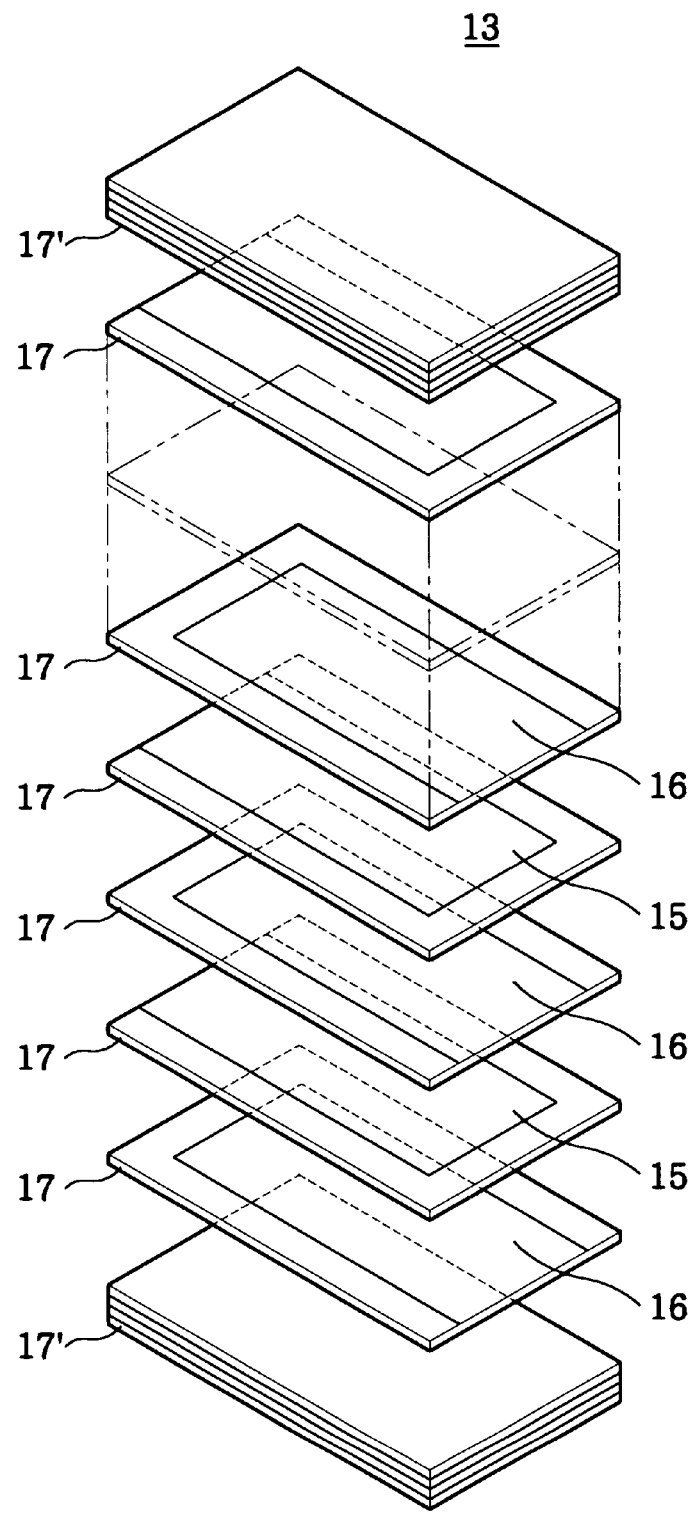
FIG. 7 is an exploded perspective view of a sintered body in accordance with the present invention.

Referring to FIG. 7, there is illustrated an exemplary view of the sintered body 13 shown in FIG. 6. As shown, the sintered body 13 is made by stacking the dielectric ceramic layers 17 having the internal electrodes 15, 16 thereon and several ceramic dummy layers 17' having no internal electrode, on the lower and the upper side of the stacked ceramic layers 17. The internal electrodes 15, 16 facing each other through a dielectric ceramic layer therebetween are alternatingly exposed at the opposite end surfaces of the sintered body 13. The dielectric ceramic layers 17, 17' are formed of dielectric ceramic having a core-shell grain structure described in detail with reference to FIGS. 1–5.

It should be noted that the core-shell grain structure of the present invention could be applied in other types of electric parts than the multilayer ceramic capacitor described by way of illustrating in the present invention. For instance, the inventive core-shell grain structure can be equally applied to a multilayer ceramic LC hybrid component having a capacitor portion.

The preferred embodiments of the invention will now be described in further detail by way of illustration based on Examples.

EXAMPLE 1

To obtain dielectric ceramics for multilayer ceramic capacitors, a ceramic powder mixture was prepared by mixing 97.5 wt % of $BaTiO_3$ powder with a mean diameter of 0.4 µm, 1.3 wt % of MgO powder and 1.2 wt % of $SiO_2$ powder as a sintering additive. The ceramic powder mixture was ball milled with pure water for 15 hours and then heat-treated at 1200° C. for 2 hours. Thereafter, 1.5 wt % of $Ho_2O_3$ powder and 1.5 wt % of $SiO_2$ powder were added to the 97.0 wt % of the heat-treated ceramic powder mixture thus obtained and this mixture was ball milled with pure water for 15 hours and then heat-treated at 1000° C. for 2 hours. Water and an organic binder were added to the final ceramic powder mixture thus produced to obtain slurry.

The slurry was formed into ceramic green sheets with a thickness of 10 µm by a reverse coater. Then, a conductive paste was coated on the ceramic green sheets to form internal electrode and 10 green sheets thus provided were stacked to produce a laminated body. The laminated body was cut into a plurality of separate laminated elements. Thereafter, external electrodes were formed on two opposite end portions of the laminated elements to produce multilayer ceramic elements.

The multilayer ceramic elements were sintered at 1200° C. in a reductive atmosphere for 1.5 hours, thereby obtaining multilayer ceramic capacitors of 3.2 mm×1.6 mm×1.6 mm.

Dielectric ceramic layers included in the multilayer ceramic capacitors thus fabricated were formed of a plurality of dielectric ceramic grains 1 as schematically shown in FIG. 1. Each of the dielectric ceramic grains generally had the core-shell grain structure including ferroelectric core 2 mainly composed of $BaTiO_3$ at the center of the grain 1 and the paraelectric shell 3 encompassing the core 2. The shell 3 was divided into two layers, i.e., an inner shell portion 3b where Mg was diffused in $BaTiO_3$ and an outer shell portion 3a where Mg and Ho were diffused in $BaTiO_3$. The core was encompassed by the inner shell portion 3b, which in turn was surrounded by the outer shell portion 3a.

The dielectric ceramic obtained through the process described above had a dielectric constant of 3350, greater than 3000. The tan δ of the multilayer ceramic capacitors was about 3.9, less than 4.0. Endurance life of the capacitors obtained by the accelerated life test performed under the condition of 150° C., 100 V was 39860 seconds.

EXAMPLE 2

While the 1.3 wt % of MgO was first added to the dielectric ceramic material having $BaTiO_3$ as a major component thereof in Example 1, the 1.3 wt % of $Ho_2O_3$ was first added and the mixture of the both was heat-treated at 1000° C. for 2 hours in Example 2. Thereafter, 1.3 wt % of MgO was added in lieu of 1.3 wt % of $Ho_2O_3$ in Example 1 to the heat-treated mixture of $Ho_2O_3$ and the $BaTiO_3$ based ceramic powder. Dielectric ceramic slurry was made by employing the same method as in Example 1 except that the processes described above and multilayer ceramic capacitors were manufactured by using the slurry.

The dielectric ceramic thus obtained exhibited a dielectric constant of 3210, greater than 3000, and the tan δ of 3.4, not greater than 4.0. The endurance life of the capacitors obtained by the accelerated life test performed under the condition of 150° C., 100 V was 52980 seconds.

EXAMPLE 3

In this Example, 1.3 wt % of MgO and 1.3 wt % of $Ho_2O_3$ were mixed together with the $BaTiO_3$ dielectric ceramic material and the mixture was heat-treated at 1000° C. for 2 hours. When the mixture was ball milled to make slurry, large beads were used to remove some parts of shells. The slurry was made by the same method as in Example 1 except that the processes described above and multilayer ceramic capacitors were manufactured by using the slurry.

The dielectric ceramic thus obtained exhibited a dielectric constant of 3240, not less than 3000, and the tan δ of 3.8, not greater than 4.0. The endurance life of the capacitors obtained by means of the accelerated life test performed under the same condition as in Example 1 was 68360 seconds.

COMPARATIVE EXAMPLE

The ceramic capacitors of the comparative example were fabricated in a similar manner as in the Example 3, excepting that large beads were not used in producing the slurry.

The dielectric ceramic thus obtained exhibited a dielectric constant of 2780, less than 3000, and the tan δ of 4.2, greater than 4.0. The endurance life of the capacitors measured by means of accelerated life test performed under the same condition as in Example 1 was 1200 seconds.

Table shows the test results of the Examples 1–3 and the comparative Example.

TABLE

| Example | Delectric Constant | tan δ | Endurance Life (150° C., 100 V) | Remarks |
| --- | --- | --- | --- | --- |
| Example 1 | 3350 | 3.9 | 39860 sec. | heat treatment of MgO first |
| Example 2 | 3210 | 3.4 | 52980 sec. | heat treatment of Ho$_2$O$_3$ first |
| Example 3 | 3240 | 3.8 | 68360 sec. | simultaneous heat treatment of MgO and Ho$_2$O$_3$ with breaking shells |
| Comparative Example | 2780 | 4.2 | 1200 sec. | simultaneous heat treatment of MgO and Ho$_2$O$_3$ without breaking shells |

In accordance with the present invention as described above, the shell can be constituted by at least two separate shell portions respectively having different functions of improving, e.g., a reduction resistance characteristic, a breakdown voltage and operating life characteristic, and a temperature, especially B temperature characteristic. These shell portions can be adaptively disposed on the surface of the core. For instance, the shell portions can be disposed radially on the surface of the core as in FIGS. 1 and 2, non-radially but in direct contact with the surface of the core as in FIGS. 3–5. Further, some parts of the core can be exposed as shown in FIGS. 3 and 4. Therefore, the properties of the dielectric ceramics and electric parts employing therein such dielectric ceramics can be optimized by adaptively forming shell portions of desired characteristics to have a shell structure suitable for the purpose.

While the invention has been shown and described with respect to the preferred embodiments, it will be understood by those skilled in the art that various changes and modifications may be made without departing from the spirit and scope of the invention as defined in the following claims.

What is claimed is:

1. Dielectric ceramic comprising:
    dielectric ceramic grains having BaTiO$_3$ as a major component thereof, a portion of the dielectric ceramic grains having a ferroelectric core and a paraelectric shell into which Mg and a rare earth element are diffused, the shell being located at least on a part of a surface of the core,
    wherein the shell includes at least two shell portions having different components diffused thereinto, respectively.

2. The dielectric ceramic of claim 1, wherein the shell portions are radially disposed on one another.

3. The dielectric ceramic of claim 1, wherein the shell portions are unevenly distributed on the surface of the core.

4. The dielectric ceramic of claim 3, wherein parts of the shell portions overlap with each other.

5. A multilayer ceramic electric part comprising the dielectric ceramic of claim 1.

6. The multilayer ceramic electric part of claim 5, wherein the shell portions are radially disposed on one another.

7. The multilayer ceramic electric part of claim 5, wherein the shell portions are unevenly distributed on the surface of the core.

8. The multilayer ceramic electric part of claim 7, wherein parts of the shell portions overlap with each other.

9. A method for manufacturing the multilayer ceramic electric part of claim 5, comprising the steps of:
    producing a ceramic powder mixture having ceramic particles, the producing step including the step of mixing MgO and a substance containing a rare earth element with a BaTiO$_3$ based dielectric ceramic material; and
    removing portions of surfaces of the ceramic particles.

10. A method for manufacturing the dielectric ceramic of claim 1, comprising the steps of:
    mixing one of MgO and a substance containing the rare earth element with a BaTiO$_3$ based dielectric ceramic material to produce a first powder mixture;
    heat-treating the first powder mixture;
    mixing the other one of MgO and the substance with the heat-treating mixture to produce a second powder mixture; and
    heat-treating the second powder mixture.

11. Dielectric ceramic comprising:
    dielectric ceramic grains having BaTiO$_3$ as a major component thereof, at last a portion of the dielectric ceramic grains having a core-shell structure with a core and a shell located at least on a part of a surface of the core,
    wherein the shell includes a first shell portion into which Mg and a rare earth metal element are diffused and a second shell into which one of Mg and the rare earth element is diffused,
    whereby the properties of the dielectric ceramic can be optimized by adaptably forming shell portions of desired characteristics to have a shell structure suitable for a purpose.

12. The dielectric ceramic of claim 11, wherein the second shell portion is located between the core and the first shell portion.

13. The dielectric ceramic of claim 11, wherein the shell includes a third shell portion into which the other one of Mg and the rare earth is diffused.

14. The dielectric ceramic of claim 11, wherein a portion of the surface of the core is covered by the first shell portion and another portion of the surface of the core is covered by the second shell portion.

15. The dielectric ceramic of claim 14, wherein parts of the shell portions overlap with each other.

16. A multilayer ceramic electric part comprising the dielectric ceramic of claim 11.

17. The multilayer ceramic electric part of claim 16, wherein the second shell portion is located between the core and the first shell portion.

18. The multilayer ceramic electric part of claim 16, wherein a portion of the surface of the core is covered by the first shell portion and another portion of the surface of the core is covered by the second shell portion.

19. A method for manufacturing the multilayer ceramic electric part of claim 16, comprising the steps of:

mixing one of MgO and a substance containing the rare earth element with a $BaTiO_3$ based dielectric ceramic material to produce a first powder mixture;

heat-treating the first powder mixture;

mixing the other one of MgO and the substance with the heat-treating mixture to produce a second powder mixture; and heat-treating the second powder mixture.

20. A method for manufacturing the dielectric ceramic of claim 11, comprising the steps of:

mixing MgO and a substance containing the rare earth element with a $BaTiO_3$ based dielectric material to produce a mixture;

heat-treating the mixture to produce ceramic particles; and removing portions of surfaces of the ceramic particles.

* * * * *